United States Patent [19]

Lee et al.

[11] Patent Number: 4,953,236

[45] Date of Patent: Sep. 4, 1990

[54] AUTOMATIC MIXING FAUCET

[76] Inventors: Chang H. Lee, 300 Winston Dr., Apt. 810, Cliffside Park, N.J. 07010; Young J. Kim, 103-4, Ko clluch-Dunk, Ku-Koku, Seoul, Rep. of Korea

[21] Appl. No.: 359,994

[22] Filed: Jun. 1, 1989

Related U.S. Application Data

[63] Continuation of Ser. No. 244,135, Sep. 14, 1988, Pat. No. 4,886,207.

[51] Int. Cl.$^5$ .............................................. E03C 1/04
[52] U.S. Cl. .......................................... 4/194; 4/623; 251/129.04; 236/12.12
[58] Field of Search ................. 236/12.12; 4/623, 194; 251/129.04; 137/613

[56] References Cited

U.S. PATENT DOCUMENTS 4,711,392 12/1987 Kidouchi et al. ................ 236/12.12
4,762,273 8/1988 Gregory et al. ............... 251/129.04

Primary Examiner—William E. Wayner
Attorney, Agent, or Firm—Pasquale A. Razzano

[57] ABSTRACT

An automatic service water tap is disclosed in which a battery operated motor is provided for controlling a water supply valve in response to the presence or absence of an object positioned within the range of an infrared generating and detecting system mounted in the tap. The valve operates using only a small amount of electric power under the control of a circuit which draws no electric power once the valve is moved to its opened or closed condition. Thus the consumption of the electric power is minimized to almost zero and the valve can be utilized for a long period of time only with a small single battery.

3 Claims, 20 Drawing Sheets

FIG. 6
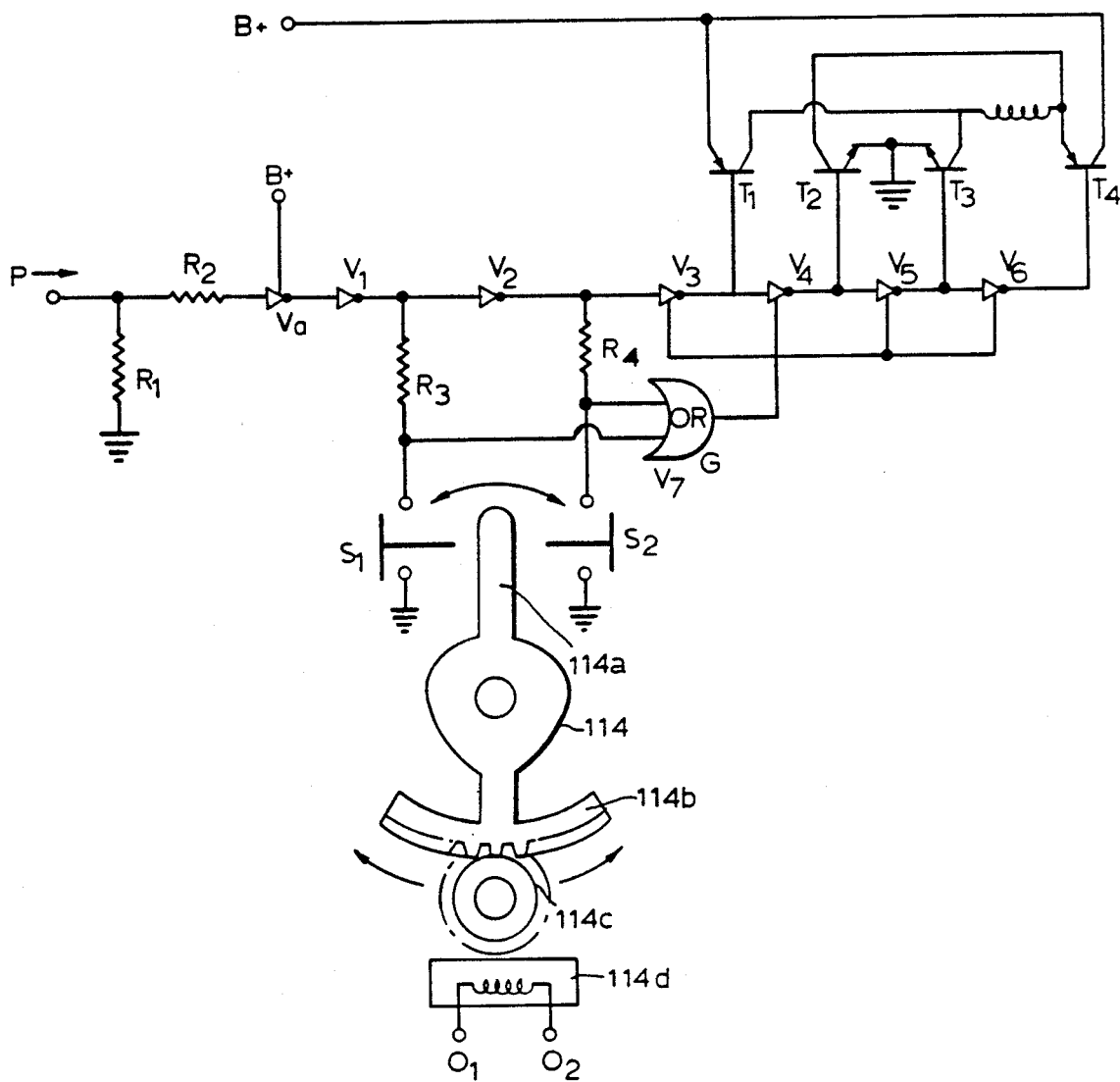
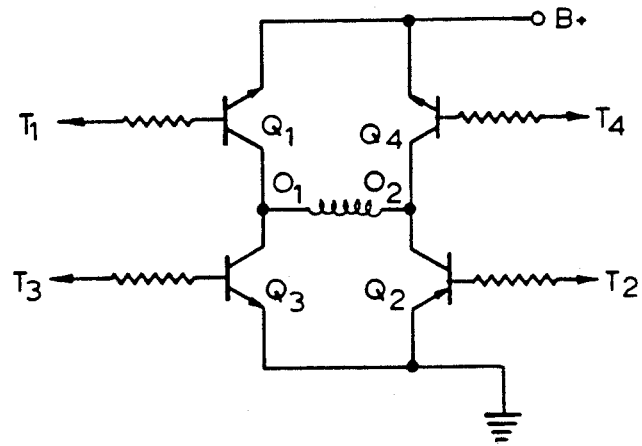
FIG. 17

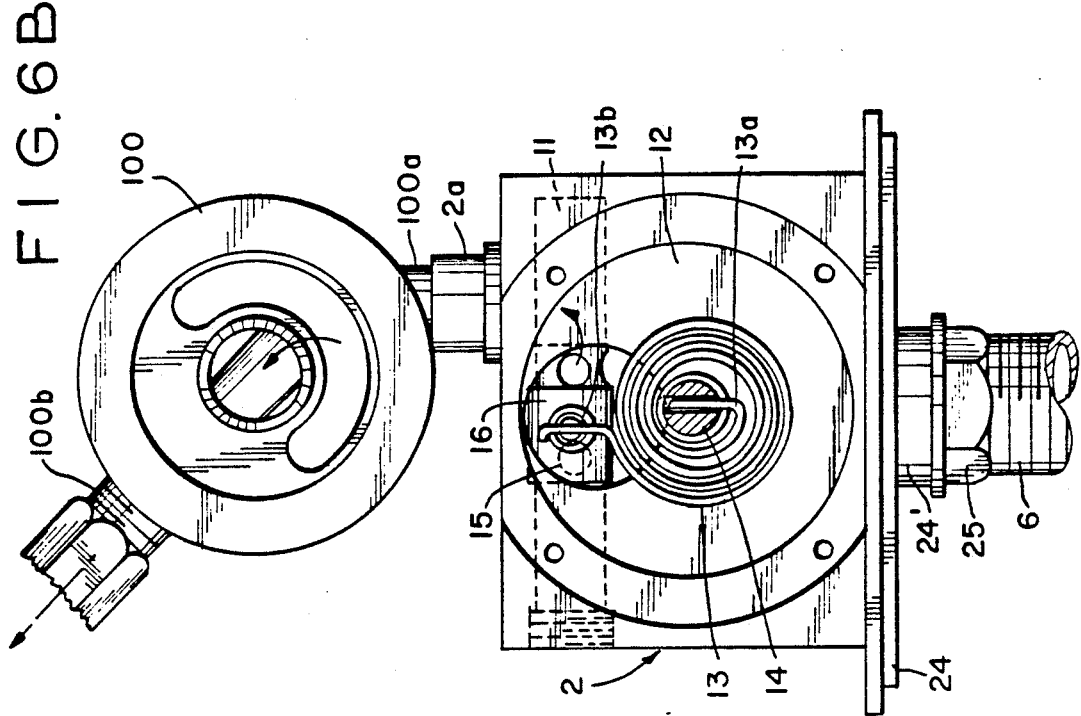
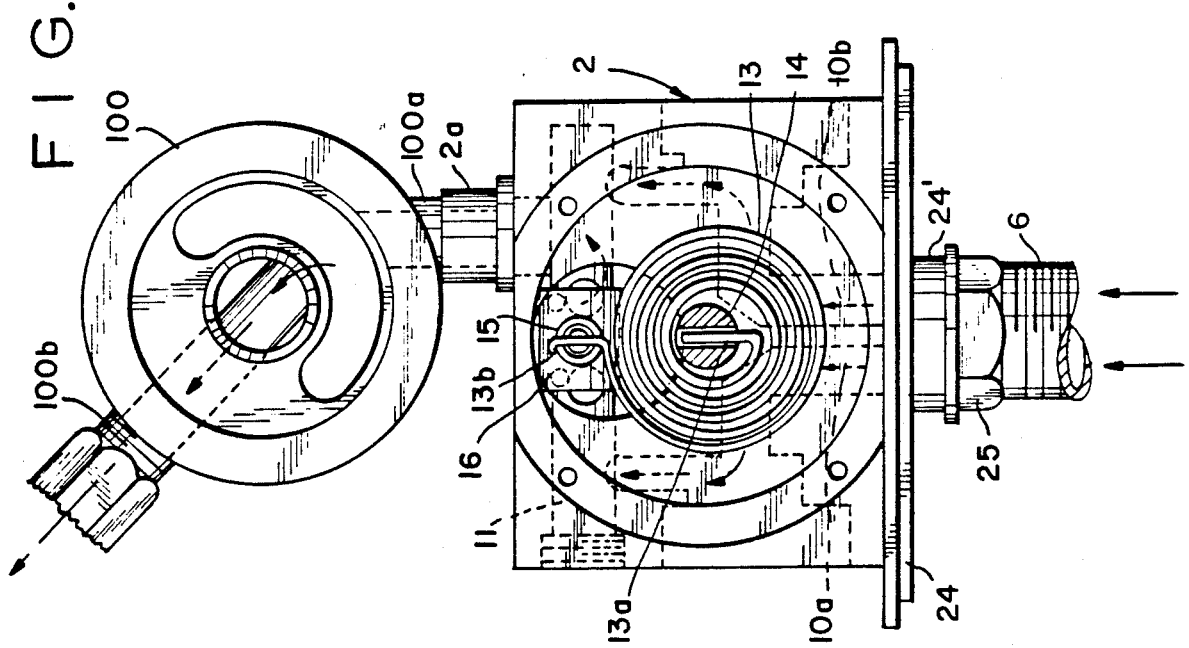

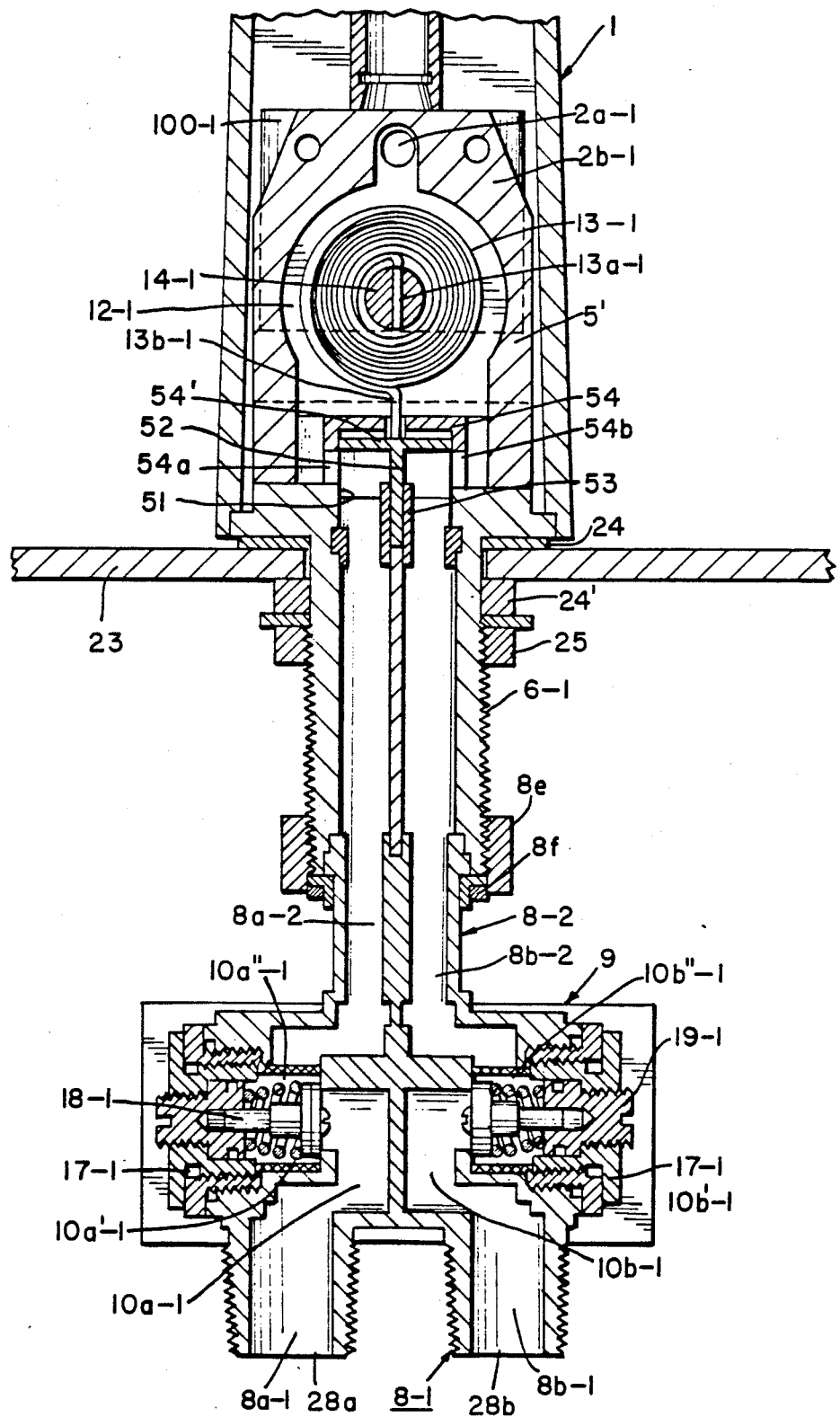
F I G. 14

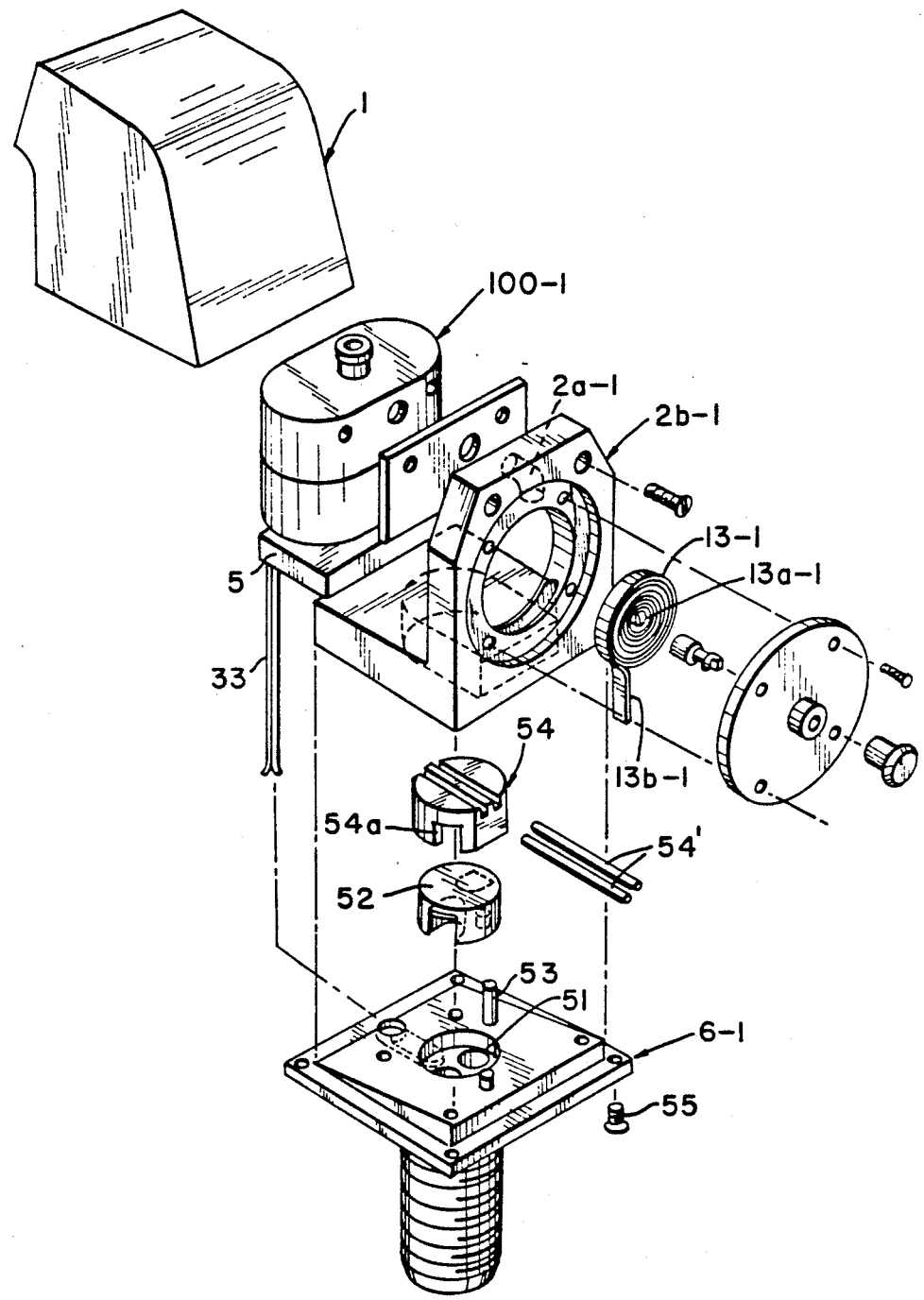
F I G. 15

AUTOMATIC MIXING FAUCET

This application is a continuation of application Ser. No. 244,135, filed Sept. 14, 1988, now U.S. Pat. No. 4,886,207.

BACKGROUND OF THE INVENTION

The present invention relates to a service water tap or faucet which automatically controls operation and discharge of a water supply.

More specifically the invention relates to an automatic service water tap or faucet which comprises, within a specially designed body, one or more detecting sensors mounted in the tap, a water supply valve connected to and controlled by the sensor(s) (which may be either AC or DC powered), a mixing valve for mixing hot and cold water, a built-in check valve, and filters arranged so that hot and cold service water are mixed fully and automatically to a predetermined set temperature and will automatically flow out of the tap without the need to operate a tap handle.

The water supply valve of the invention performs a water supply and cut off action with a minimum of electric power supplied for example by a small battery. The valve is operated in response to a signal from the detecting sensor and supplies the appropriate amount of required water. It decreases the waste of the water and is very easy to use.

PRIOR ART

Heretofore, there have been service water taps intended to be controlled automatically with an ON/OFF operation of a water supply valve by utilizing a detecting sensor. One such system is disclosed in U.S. Pat. No. 4,741,363. However, in such previously proposed devices the components are arranged independently and then connected to each other so that they could not be made small-sized and light-weight by integrating every component as an article. Therefore, the desired effects were not obtained because establishing operation of the device was not easy and the external appearance was unsatisfactory.

OBJECTS OF THE INVENTION

It is an object of the present invention to provide a service water tap whose operation is completely automatized.

It is another object of the invention to provide an automatic service water tap in which all of the operative components thereof are located within the body of the tap, so that it can be of small-size, light-weight and of good appearance.

Another object of the invention is to provide an automatic service water tap which can be easily installed in place of an existing service water tap.

Yet another object of the present invention is to provide an automatic service water tap which can be substituted for an existing conventional service water tap while keeping all of the other remaining facilities (i.e. plumbing lines) as they were without any damage.

A further object of the invention is to provide an automatic service water tap which can be easily installed without providing new electric power lines so that the construction cost will be greatly decreased and so that the device can be utilized semi-permanently.

A still further object of the present invention is to provide an automatic service water tap which has an energy saving and economical effect, by allowing the automatic service water tap to be changed easily without any difficulties in existing buildings.

SUMMARY OF THE INVENTION

In accordance with an aspect of the present invention, an automatic service water tap or faucet is provided which includes detecting sensor means for detecting a physical object to be supplied with the water out of the water tap. An electronic control unit receives an electronic signal from the detecting sensor means, processes the signal and produces an output signal to control a water supply valve for closing or opening the valve to control water flowing through the valve and thus the water tap. The output signal from the electronic control unit also controls a hot and cold water mixing valve of an automatic temperature control device. By this arrangement no turning or handling of the water tap or any other control is required and water will flow out of the water tap automatically whenever a physical object is located under the water tap.

The water supply valve of the invention includes a body having first and second chambers, and a diaphragm arranged at the partition between these chambers. The opening and the closing action of the diaphragm is achieved by the difference of supply water pressure between the water in the first chamber and that in the second chamber in response to opening and closing water by-pass holes which communicate with first chamber or second chamber respectively by turning a cam which is operated by a small DC motor. The power consumption for the opening and closing action of the water supply value is minimized, with the electric power supply for DC motor being provided by a signal control circuit which employs a C-MOS IC having a wide range of supply voltage. As a result the valve is constructed to be utilized with only a small battery for long period (e.g. 3 to 10 years) without replacing the battery.

The above and other objects, features and advantages of the present invention will be apparent from the following detailed description of illustrative embodiments thereof, wherein:

BRIEF DESCRIPTION OF THE DRAWINGS

FIG. 2a is a cross-sectional view similar to FIG. 2 of the tap of FIG. 1a;

FIG. 6A is a rear schematic diagram illustrating the water flowing condition to the automatic water supply valve as the hot and cold water are being mixed;

FIG. 6B is a schematic diagram similar to FIG. 6A illustrating the water flowing condition to the automatic water supply valve only with cold water;

FIGS. 7A to 7C are schematic diagrams illustrating the condition in which the sliding control tube opens or closes the hot or cold water flowing holes by the operation of the bimetal, in which:

FIG. 7A illustrates the condition in which the hot and cold water are mixed,

FIG. 7B illustrates the condition in which the hot water port is closed;

FIG. 7C illustrates the condition in which the cold water port is closed;

FIG. 14 is a cross sectional view similar to FIG. 6 illustrating another embodiment of the present invention in which check valves are arranged with the connecting tube;

FIG. 15 is an exploded perspective view illustrating the mixing valve structure in the interior of the tap shown in FIG. 14;

FIG. 17 is a circuit diagram similar to FIG. 13, of a modified signal control circuit for actuating the automatic water supply valve according to the present invention;

DETAILED DESCRIPTION OF THE INVENTION

Figure 1:
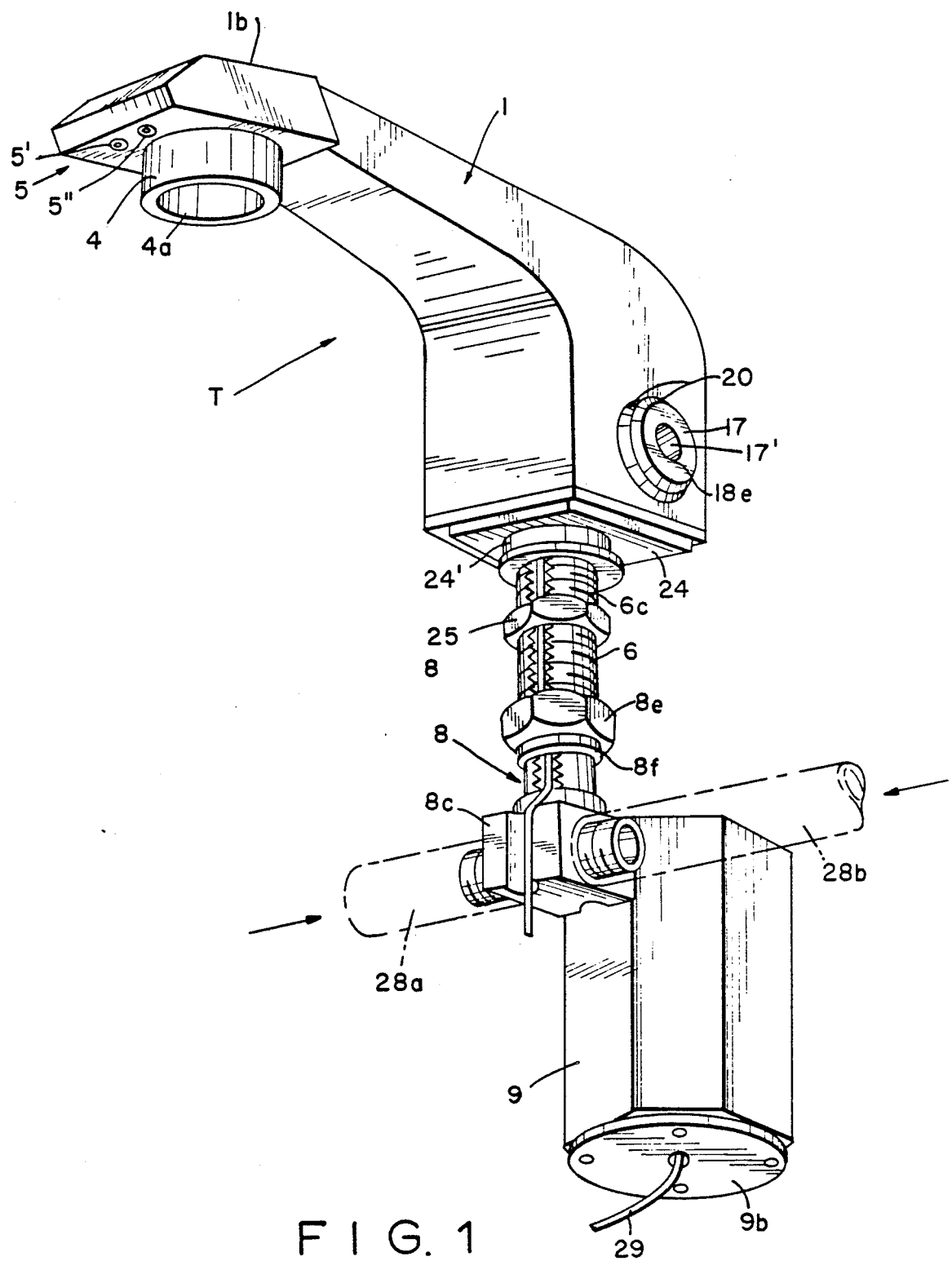
FIG. 1 is a perspective view of an automatic service water tap according to the present invention.
Figure 2:
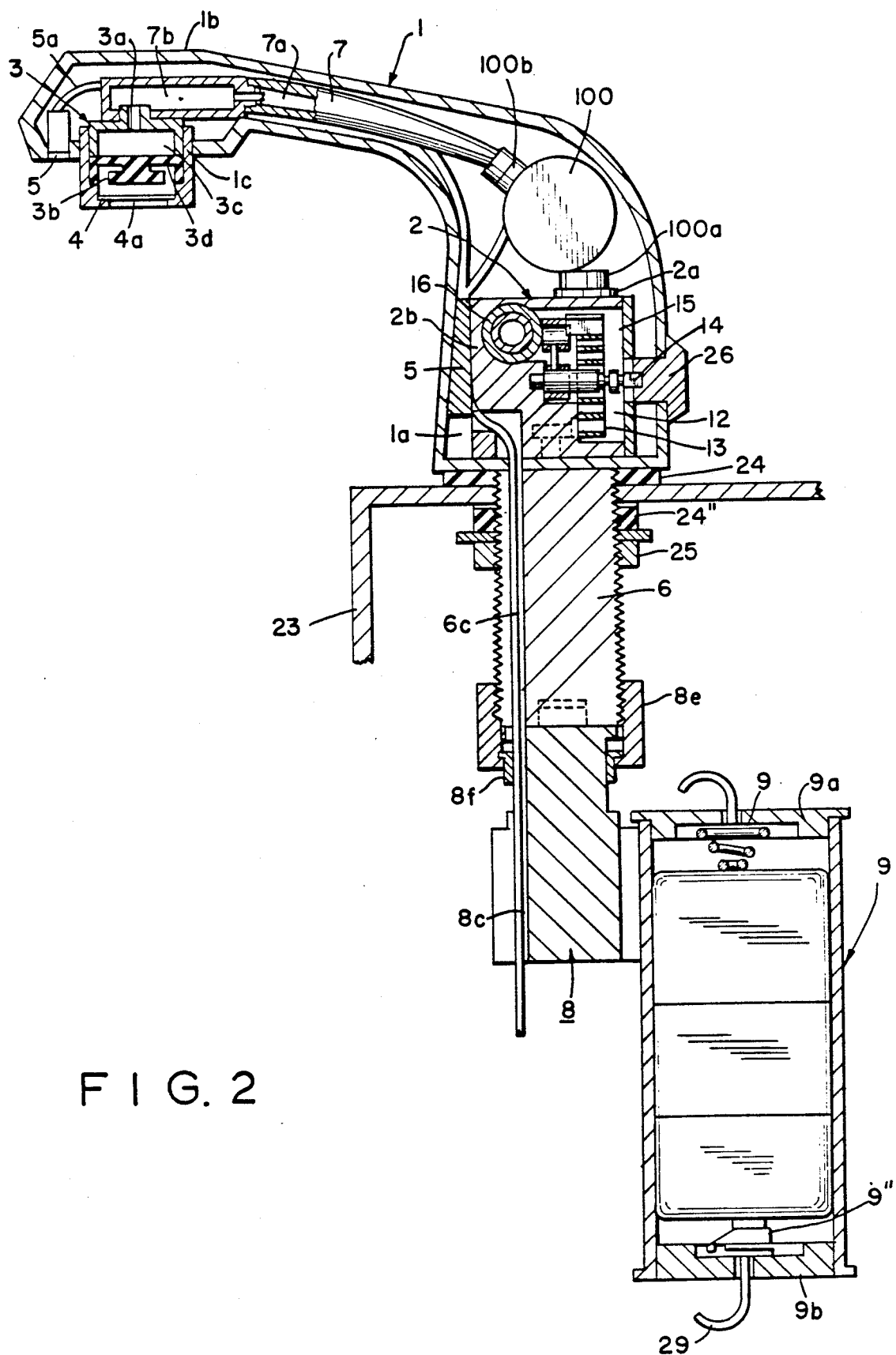
FIG. 2 is a longitudinal cross sectional view of the automatic service water tap of FIG. 1.

Referring now to the drawings, and initially FIGS. 1 and 2 thereof, an automatic service water tap T according to the present invention is illustrated which includes a hot and cold water mixing valve 2 arranged within the lower portion 1a of the body 1 of a water tap. A water discharge nozzle coupling tube 7b is mounted within the head portion 1b of the upper end of the body 1 and a cylindrical water retaining piece 3 is coupled with a threaded boss tube 3a. The latter has a water dispersing disc 3b at its bottom center which includes a plurality of water flow holes 3d formed concentrically within the dispersing disc. A water jet nozzle 4 having the plurality of the jet holes 4a formed therein, is coupled with the water retaining piece by threading in at the front end thereof and by inserting through the opening 1c formed in head portion of the water tap body 1.

A detecting sensor 5 is mounted at the bottom side of the top head 1b to be exposed outwardly at the extreme tip portion of the head of the body. The sensor is connected by a wire lead 5a to an electronic control unit 5'. The sensor 5 is generally of known construction, e.g. as shown in U.S. Pat. No. 4,741,363 and consists of an infrared signal generator 5' and a receiver 5" for receiving infrared rays emitted by generator 5' and reflected from a body or object placed below the tap to produce a potential difference and a voltage output. This signal is used, as described hereinafter, to control water flow from the tap.

Figure 1A:
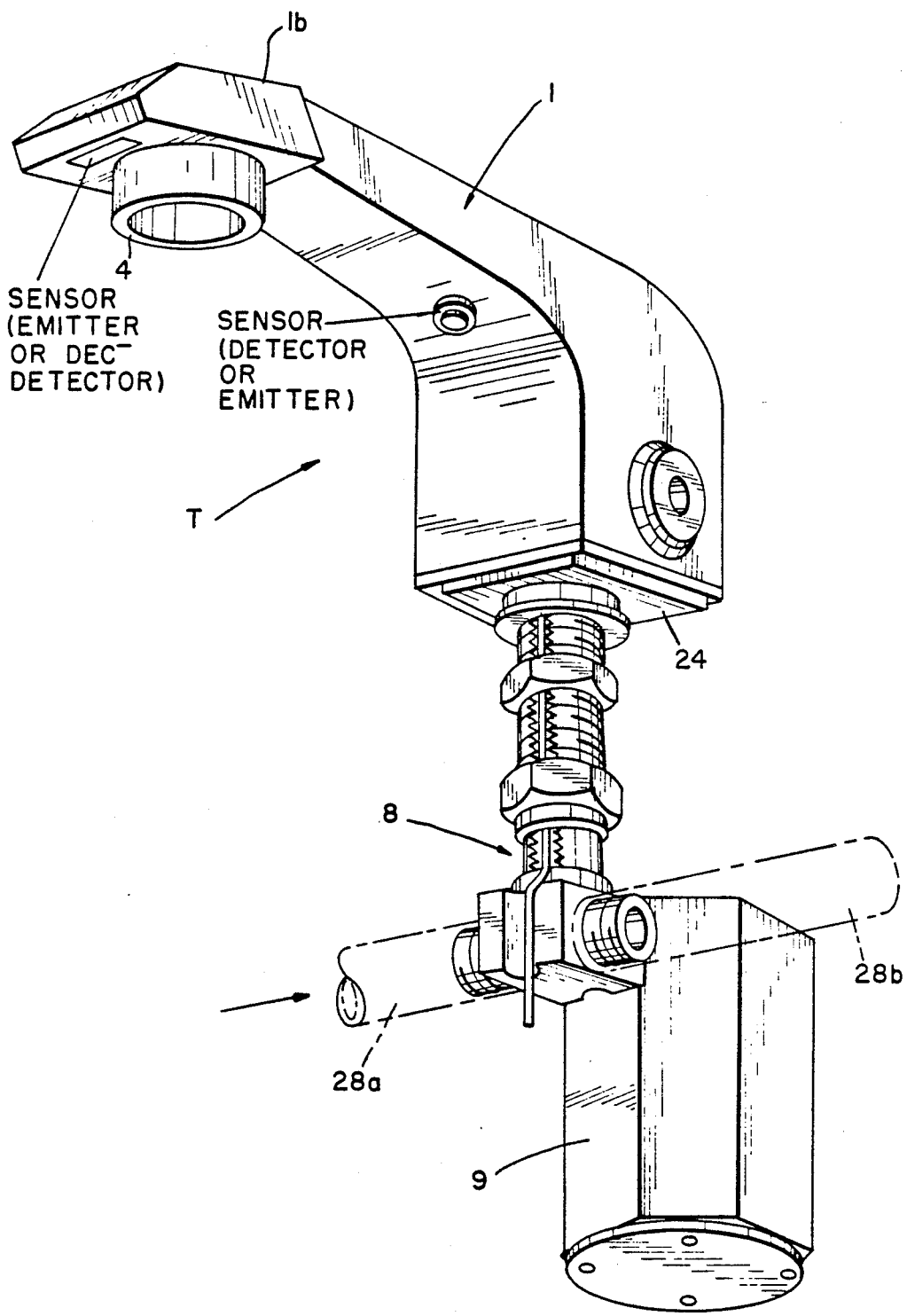
FIG. 1a is a perspective view similar to FIG. 1 showing another embodiment of the invention with the sensors and detectors located in different positions.
Figure 2A:
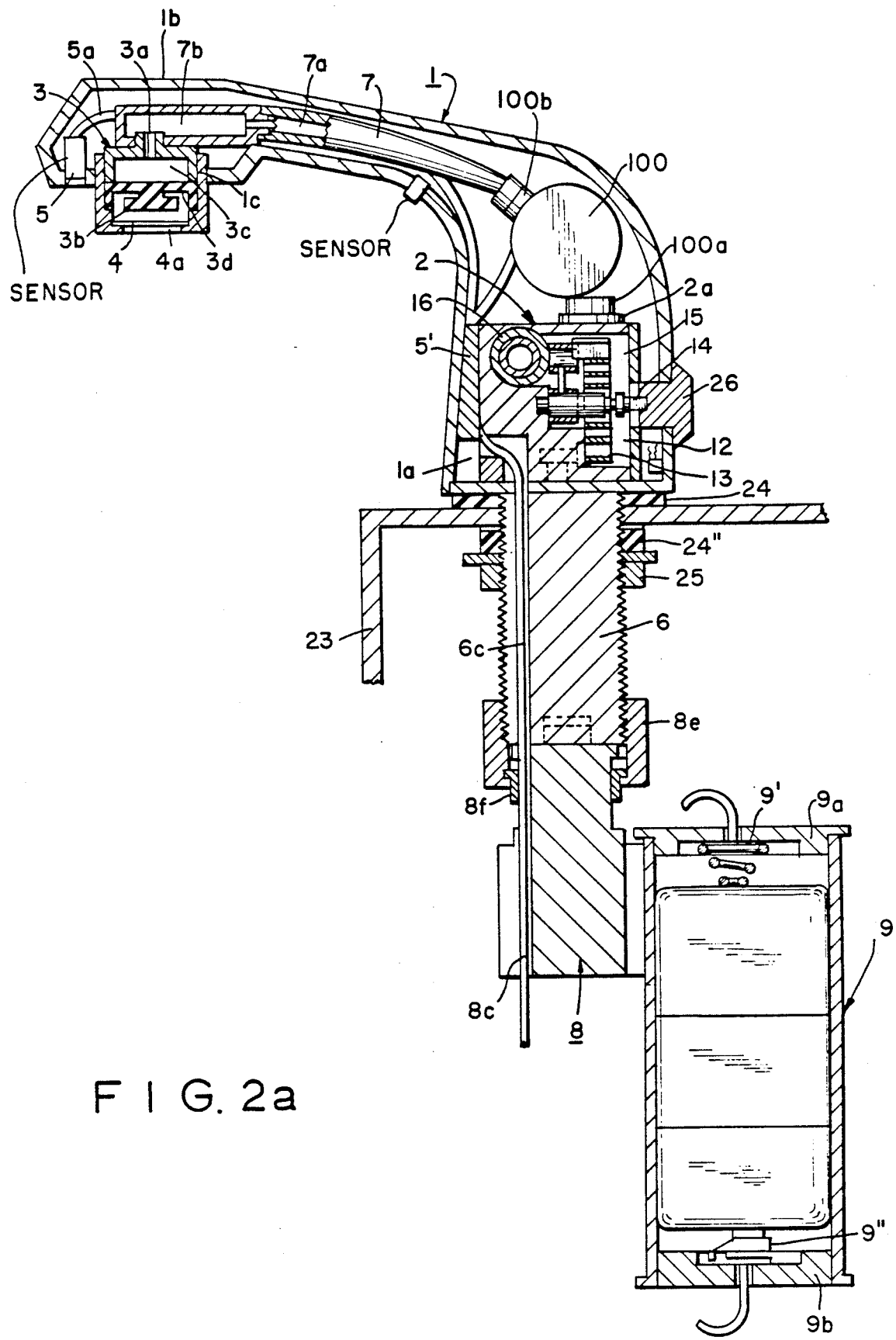

As seen in FIG. 1 the infrared signal generator and receiver may be positioned side by side or, as seen in FIG. 1a, they may be mounted at angular position with respect to each other. In addition, the infrared generation may be mounted in any desired angular position from 0° to 60° from the vertical, as seen in FIG. 2a, as desired by modifying its mounting opening appropriately. Moreover the power of the generated infrared beam may be adjusted to vary its sensitivity by a control screw 5''' or the like, in any known manner.

A water supply valve 100 is located within the base of tap 1 and is connected at one side 100a to the outlet 2a of a hot and cold water mixing valve 2 and at its outlet side 100b to the hose 7. The latter, in turn, is connected to tube 7b by a nipple 7a to pass water from valve 100 to nozzle 4.

Figure 4:
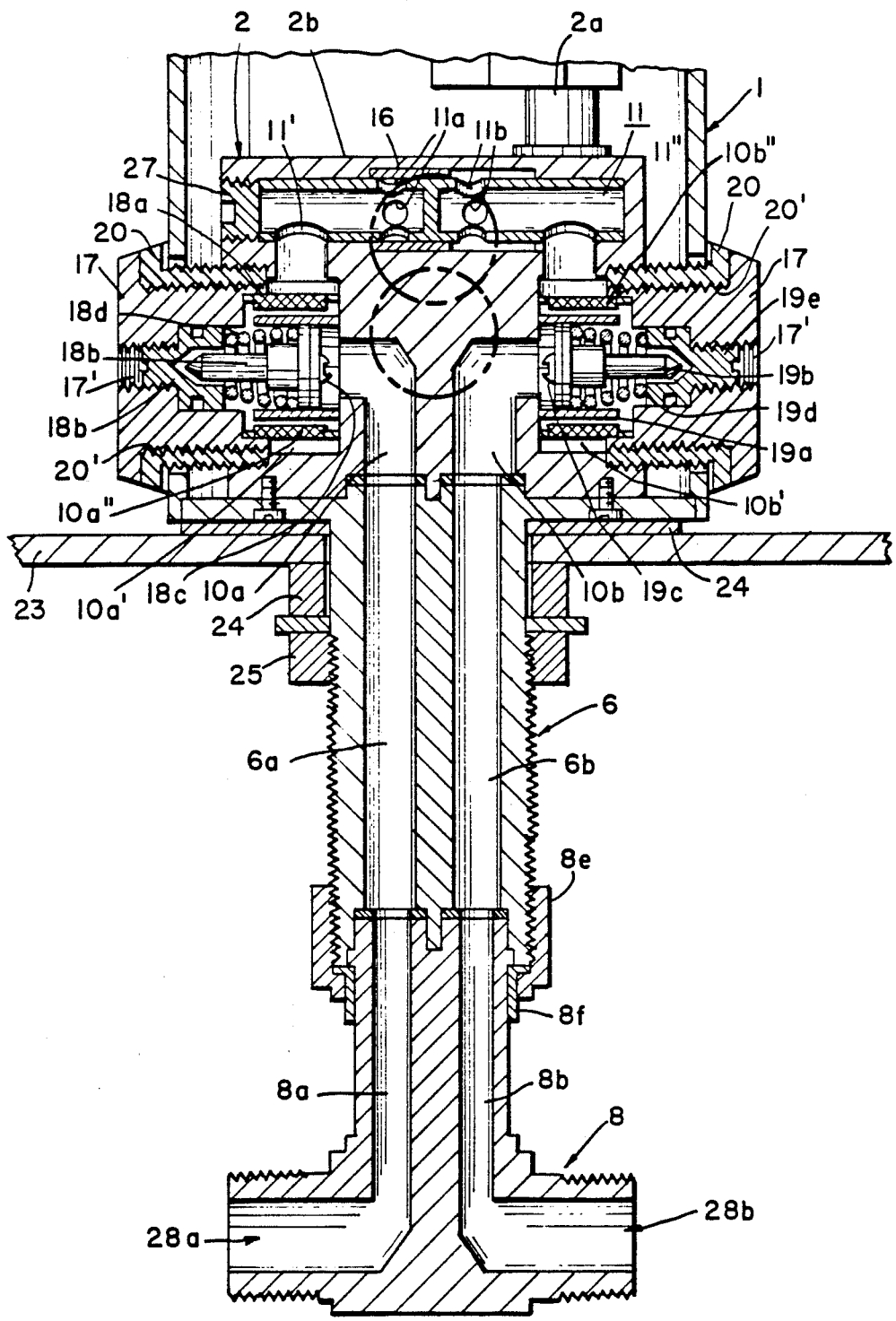
FIG. 4 is a cross sectional view of the mixing valve of the automatic temperature control device.

As seen in FIGS. 2 and 4, the mounting pipe or stem 6 of the tap 1 has hot and cold water passages 6a, 6b formed internally therein. A vertical, straight groove 6c is formed externally in the threaded surface of stem 6 for holding an electric wire. Stem 6 extends from the bottom surface of valve body 2b of hot and cold water mixing valve 2 and is secured to the surface of a sink or the like with a water tap fixing nut 25 and gasket 24'. A water supply tee or connector pipe 8, having hot and cold water passages 8a, 8b formed internally therein, is threadedly connected in communication with stem 6 as seen in FIG. 4, with a coupling nut 8e and stop ring 8f. Tee 8 also includes a vertical straight external groove 8c for receiving an electric wire.

A battery container 9 having a top plate 9a including a contact spring 9' is fixed in any convenient manner behind and to connector pipe 8. Battery container 9 also includes a bottom plate 9b having a contact terminal piece 9". The container is dimensioned to accept appropriately sized batteries to power the unit as described hereinafter.

The body 26 of hot and cold water mixing valve 2 has hot and cold water passages 10a, 10b located to communicate with the hot and cold water passages 6a, 6b of stem 6. Passages 10a and 10b (see FIG. 4) are formed to communicate with a hot and cold water mixing chamber 12 (see FIG. 2) through filter chambers 10a', 10b' (see FIG. 4) located at opposite sides of the valve body 2. Chambers 10a' and 10b' communicate with a hot and cold water mixing pipe 11 (FIG. 4) through ports 11', 11". Pipe 11 has hot and cold water ports 11a, 11b formed therein extending in four generally perpendicular related directions. These ports are arranged to communicate with the hot and cold water mixing chamber 12. That chamber, in turn, is connected to the outlet pipe 2a of the body 2.

Figure 3:
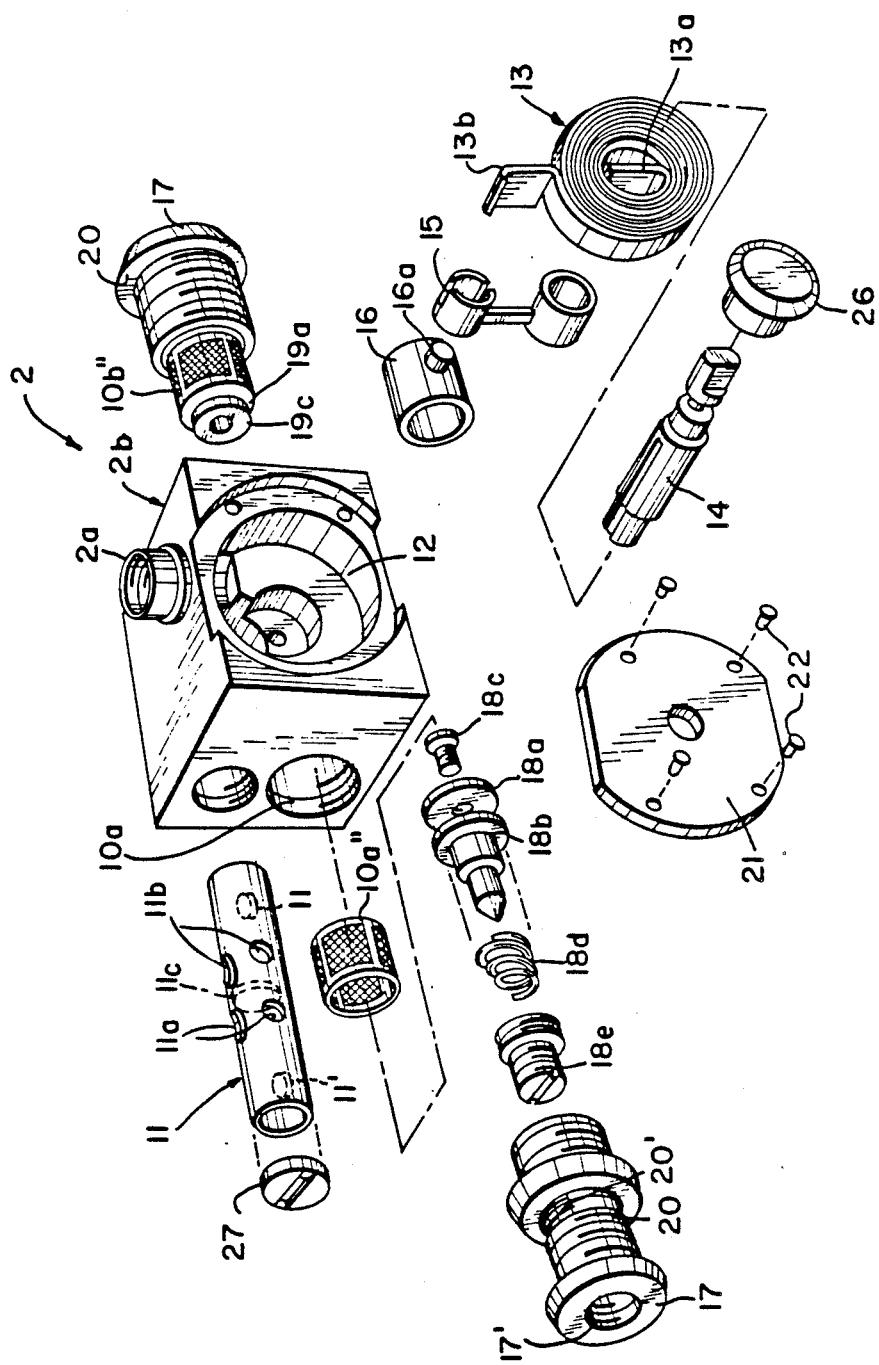
FIG. 3 is an exploded perspective view of the automatic temperature control device contained in the tap of FIG. 1.

The inner end 13a of a spirally shaped bimetal 13 is fixed to a temperature control setting shaft 14 (see FIGS. 2 and 3) within the hot and cold water mixing chamber 12. The outer end 13b of the spirally shaped bimetal 13 is fixed to an opening and closing actuator 15. As seen in FIG. 3 the collar 15a of actuator 15 receives a stud 16a formed on a sliding control tube 16 which surrounds and slides on a portion of the hot and cold water mixing pipe 11. By this arrangement expansion or the contraction of the bimetal 13 causes actuator 15 to pivot on shaft 14 (which is received in sleeve 15b of the actuator) and thus slide tube 16 on pipe 11. This movement will open and close the hot and cold water ports 11a, 11b of pipe 11 of the hot and cold water mixing tube 11 to control the mixing temperature of the water.

Net like tubes 10a", 10b" are located within chambers 10a' and 10b' and surround check valves 18, 19. The nets serve to filter both the hot and cold water. Check valves 18, 19 include sliding pistons 18b, 19b having sealing gaskets 18a, 19a secured thereto locking bolts 18c, 19c on the faces thereof facing passages 10a and 10b. Coil springs 18d, 19d push sliding pistons 18b, 19b toward valve opening seats 18f, 19f to close passages 10a and 10b. The resilient force of the springs is adjusted by the adjusting screws 18e, 19e which are inserted into threaded holes 17' of screw sleeves 17. The latter are threadedly inserted into the threaded holes 20' of valve body fixing screw sleeves 20 which are, finally threadedly coupled to the valve body 2b of the hot and cold water mixing valve 2. Accordingly check valves 18, 19 are completely formed and allowed to open and close the hot and cold water passing paths 10a, 10b.

The automatic water supply valve 100 is illustrated in FIGS. 8–11 and 16. As seen therein valve 100 includes a valve body 102, on which a mounting plate 103 is secured above a water passageway 102a formed in the body.

Figures 12, 13:
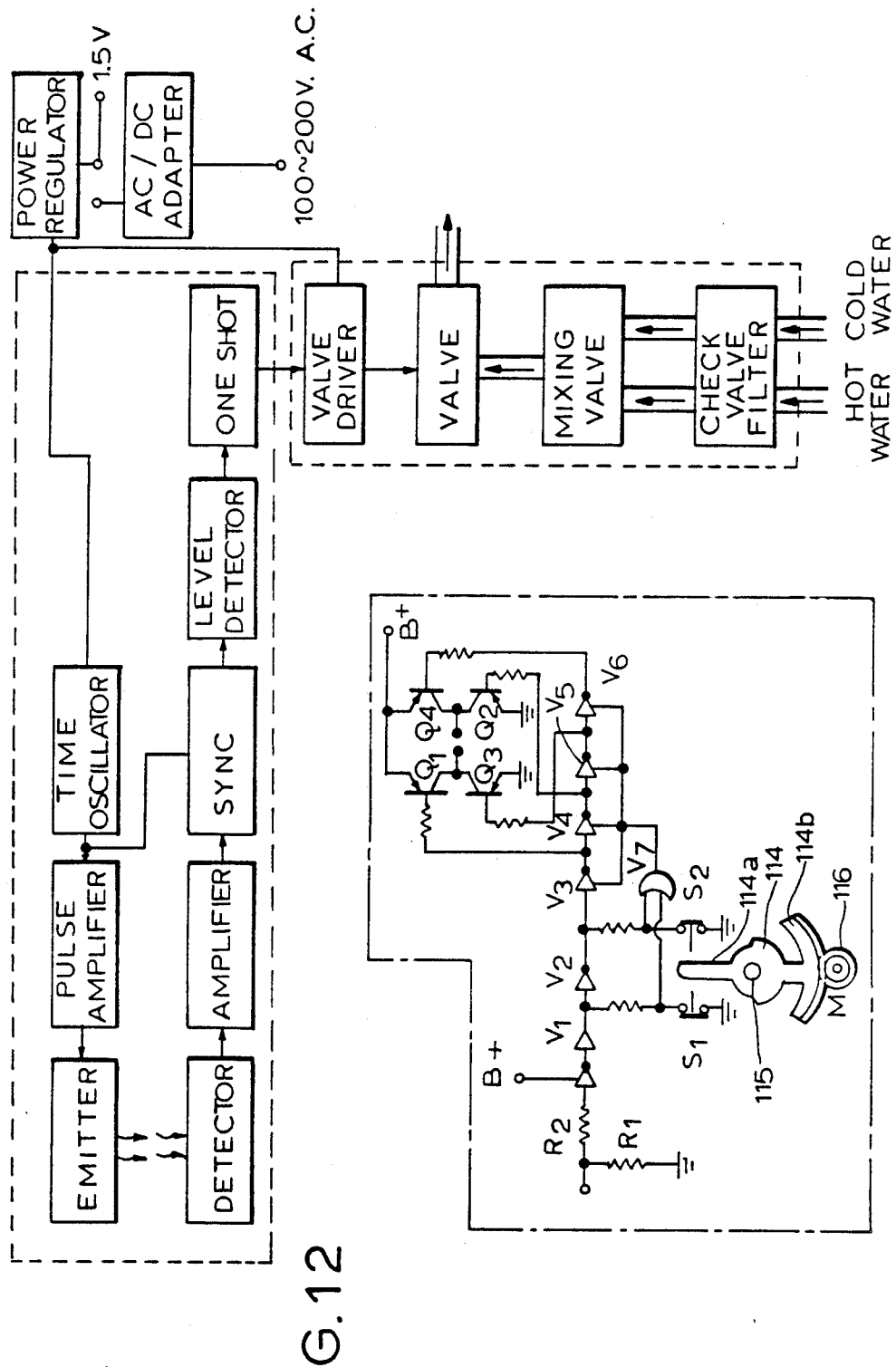
FIG. 12 is a block diagram illustrating the operation of automatic service water tap according to the present invention.
FIG. 13 is the electronic control circuit diagram of the automatic water supply valve.

In operation, the automatic water supply valve 100 receives an instruction signal from the operation control electronic circuit (FIG. 13) which is transmitted from the electronic control unit 5' (FIG. 2) according to the signal generated by the detecting sensor 5 mounted at the tip of the head of the water tap 1. Receipt of the instruction signal causes a motor 104 to operate. Rotation of motor shaft and gear 104a causes the cam 114 to rotate thereby selectively operating small diaphragms 111b, 113b to within valve 100 open or close. As described hereinafter, this causes a main diaphragm 106 in the valve to open or close so that the mixed hot and cold water is delivered to the nozzle coupling tube 7b and then passes to the water retaining piece 3, through the jet holes 4a of the water jet nozzle 4 and is dispersed uniformly with the dispersing disc 3b via the water flowing holes 3d perforated at the bottom of the water retaining chamber 3c.

Figure 16:
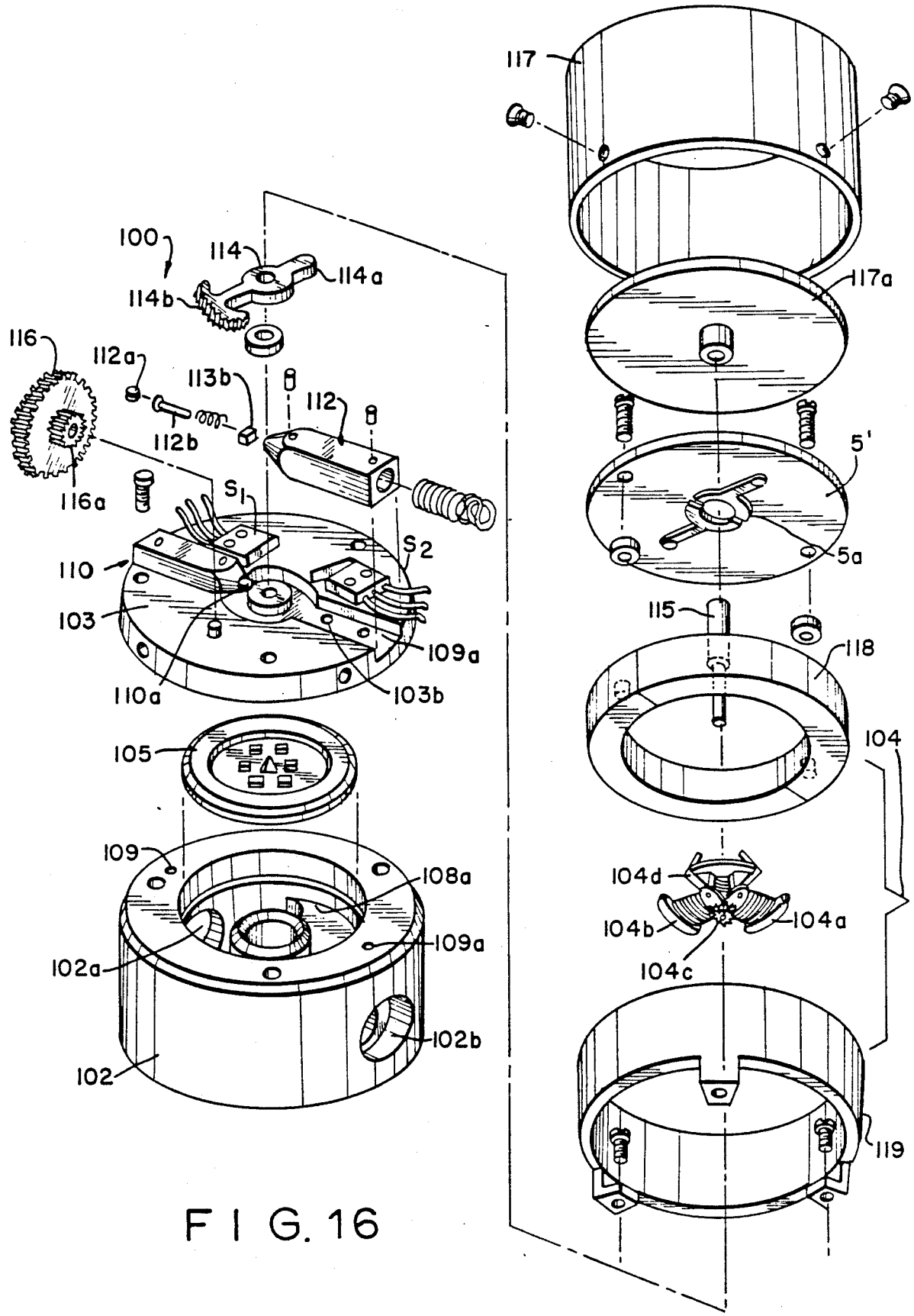
FIG. 16 is an exploded perspective view of the automatic water supply valve of the present invention.

The small DC motor assembly 104 and a signal control circuit board 5' are positioned above plate 103, as seen in FIG. 16 and covered with a valve cover 117.

Water outlet 2a is connected to the inlet 102a of valve body 102. Water entering inlet 102a can pass to a chamber 108 in body 102 toward water outlet 102b upon opening of a main diaphragm 106 when it lifts away from the main valve seat 108a formed on the top of chamber 108 in opposition to water pressure in the chamber 107 located above the diaphragm. Water enters chamber 107 through a water inlet by-pass hole 109 which communicates with chamber 107 through an inlet path port 111a of the inlet valve seat 11 located within a water inlet side cylinder 110, and via the inlet port hole 103a which penetrates mounting plate 103. The chamber 107 also communicates with the water outlet port 102b of the valve through an outlet passage 103b which penetrates mounting plate 103, thence through the outlet port 113a of the outlet valve seat 113 located within the water outlet side pilot cylinder 112 and finally through the outlet water by-pass hole 109a.

Figure 8:
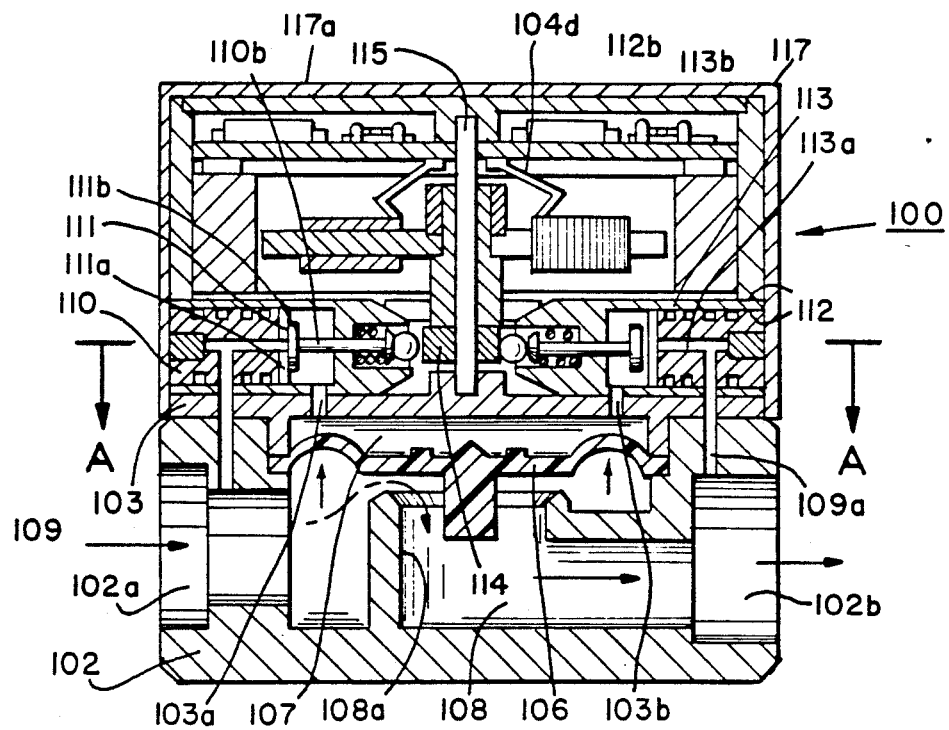
FIG. 8 is a cross-sectional view illustrating the opened condition of the automatic water supply valve.
Figure 9:
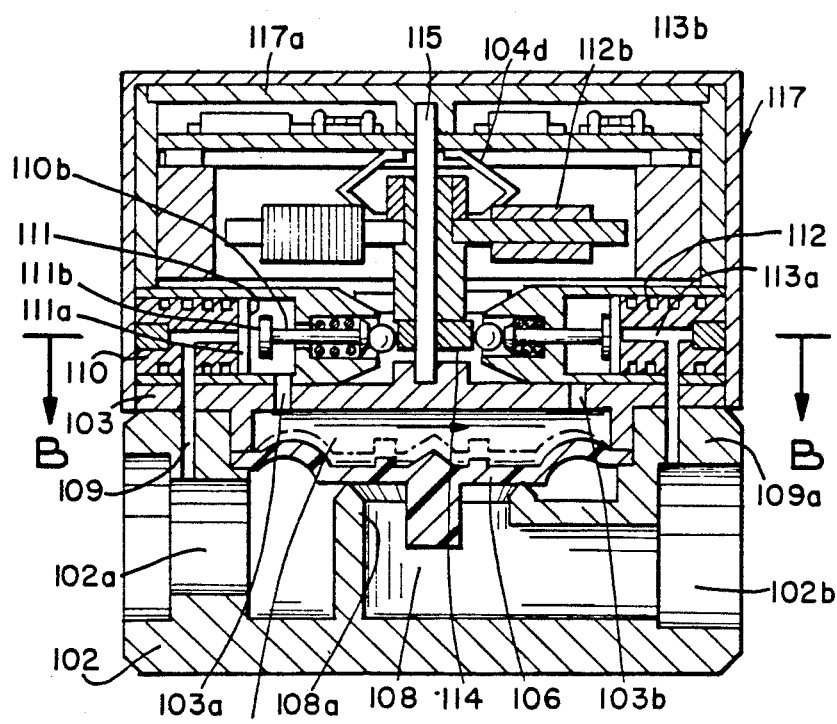
FIG. 9 is a cross sectional view similar to FIG. 8 illustrating the closed condition of the automatic water supply valve.
Figure 10:
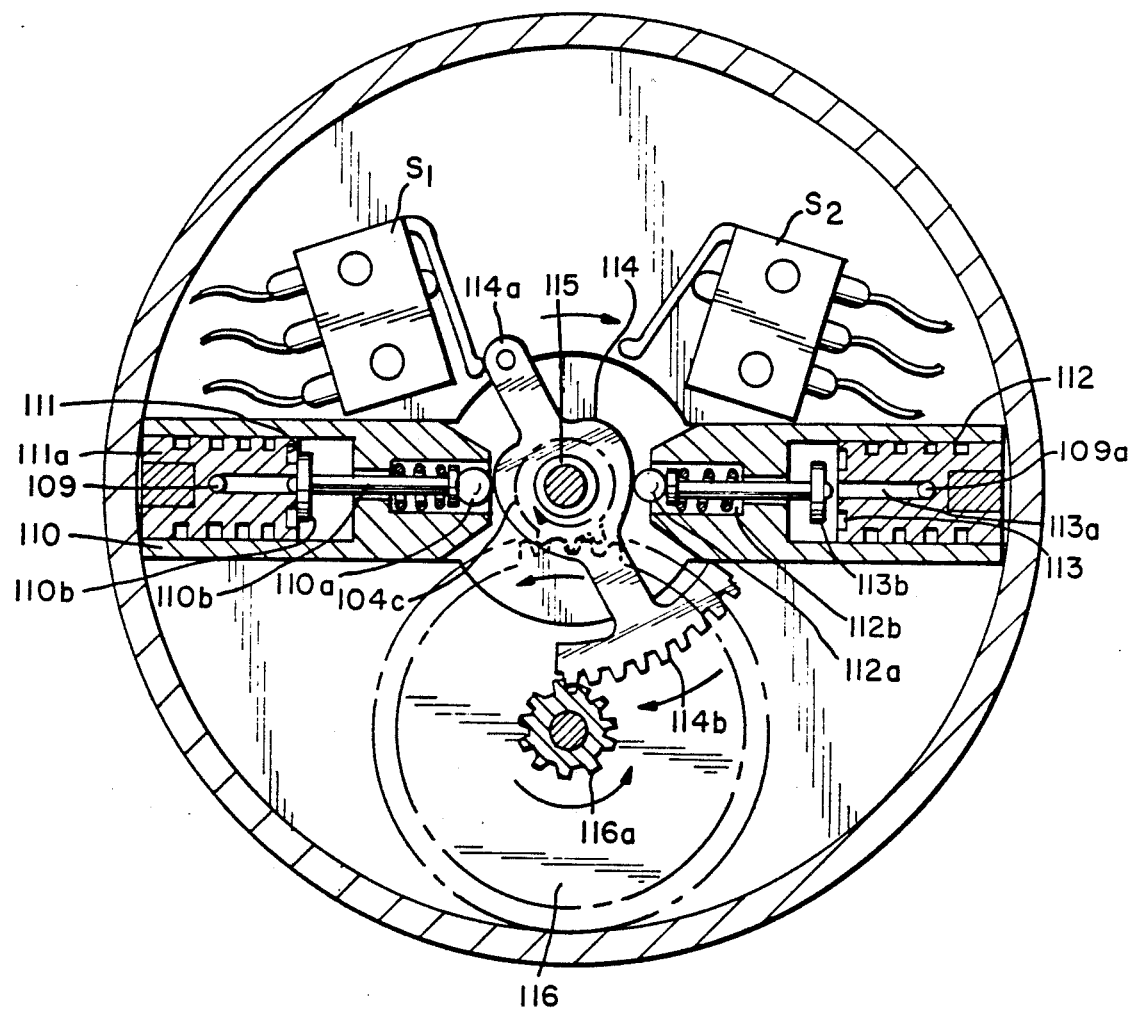
FIG. 10 is a cross sectional view taken along A—A line of the FIG. 8 illustrating the control cam at the opened condition of the automatic water supply valve.
Figure 11:
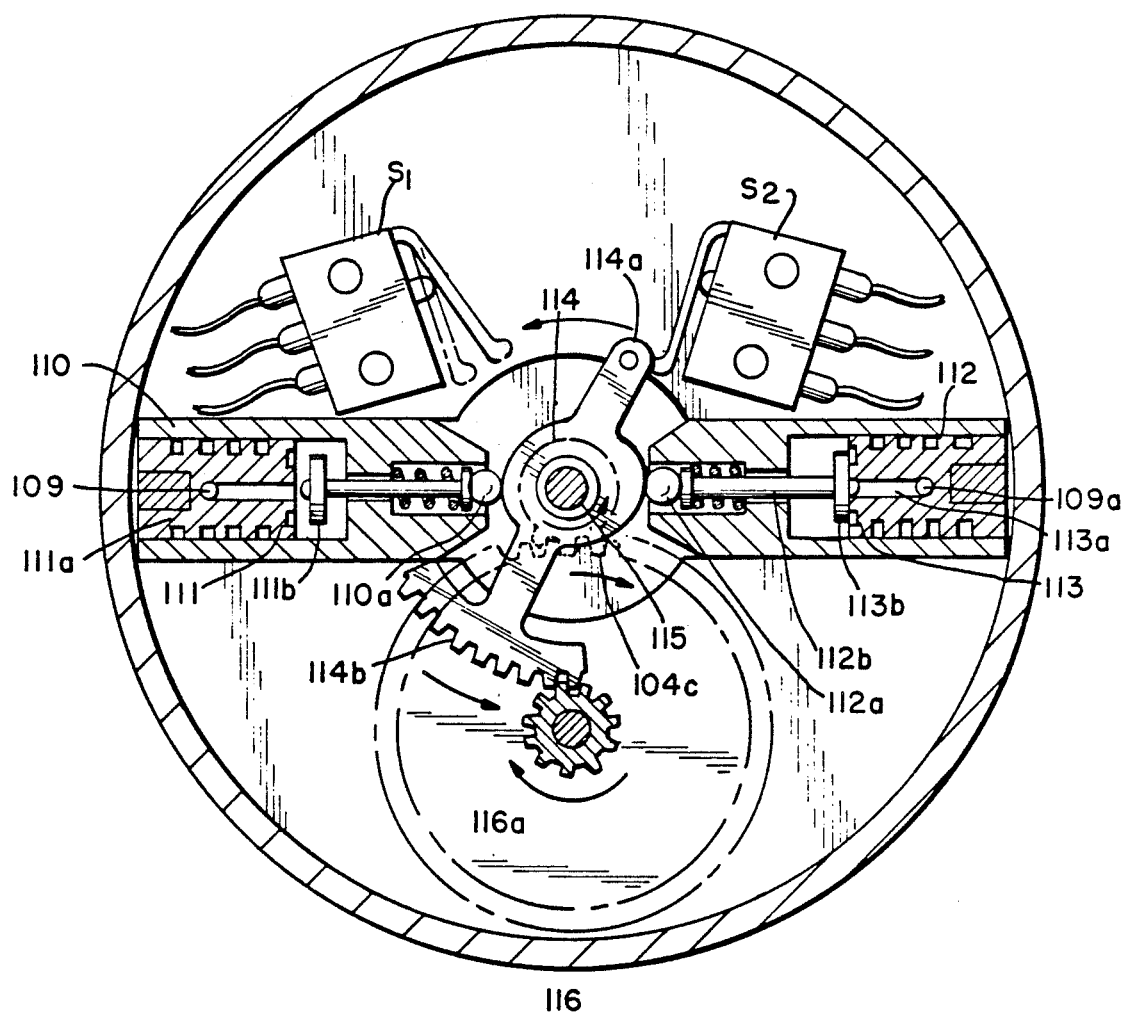
FIG. 11 is a cross sectional view taken along the B—B line of the FIG. 9 illustrating the cam control at the closed condition of the automatic water supply valve.

Steel balls 110a, 112a are inserted respectively at the front end of the pilot cylinders 110, 112, which as seen in FIG. 16, are located opposite each other, on the upper surface of mounting plate 103. Pilot pistons 110b, 112b which have pilot diaphragms 111b, 113b mounted respectively at their inner ends are biased towards each other in opposite directions within pilot cylinders 110, 112, by unnumbered springs, as seen in FIGS. 8 and 9. Cam 114 is rotatably mounted on a axle shaft 115 between each of the steel balls 110a, 112a and controls the operation of pistons 110b, 112b against the bias of their associated springs.

Cam 114 has an oscillating rod 114a formed at one end thereof extending from one side of a cam and located to push or operate the levers of microswitches S1 or S2. A fragmentary circular arc gear segment 114b is formed at the opposite end of cam 14 and meshes with the pinion 116a fixed integrally with a reduction gear 116, which, in turn, meshes with the pinion 104cfixed integrally to the rotor 104a, of the small sized motor assembly 104. The later is rotatably secured to the axle shaft 115.

Referring now to the signal control circuit of FIG. 17 a level converting circuit VO is connected in series with turn over circuits V1–V6. The output of turn over circuit V1 is connected through a resistor R3 to a terminal b of an OR gate V7 and to a terminal of microswitch S1. The output of turn over circuit V2 is connected through a resistor R4 to the terminal of microswitch S2, as well as to another input terminal the OR gate V7. The output of OR gate V7 is connected to the input terminals of turn over circuits V3–V6. The output of a turn over circuit T1 is connected to a base of a transistor Q1, and the output T2 of a turn over circuit V4 to a base of a transistor Q2. The output T3 of a turn over circuit V5 is connected to a base of a transistor Q3, the output T4 of a turn over circuit V6 is connected respectively to a base of a transistor Q4, and the transistors Q1 and Q3 and transistor Q2 and Q4 are respectively connected in parallel to the electric power supply. The collector terminal points Q1 and Q2 of the transistors Q1, Q3 and Q2, Q4 are respectively connected with the coils 104b of the rotor 104a of a small sized motor assembly.

Figure 18:
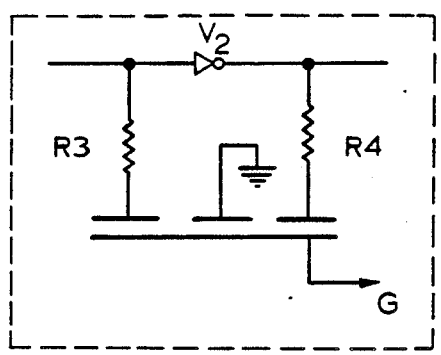
FIG. 18 is a circuit diagram of a modified embodiment of the signal control part for actuating the automatic water supply valve according to the present invention.
Figure 19:
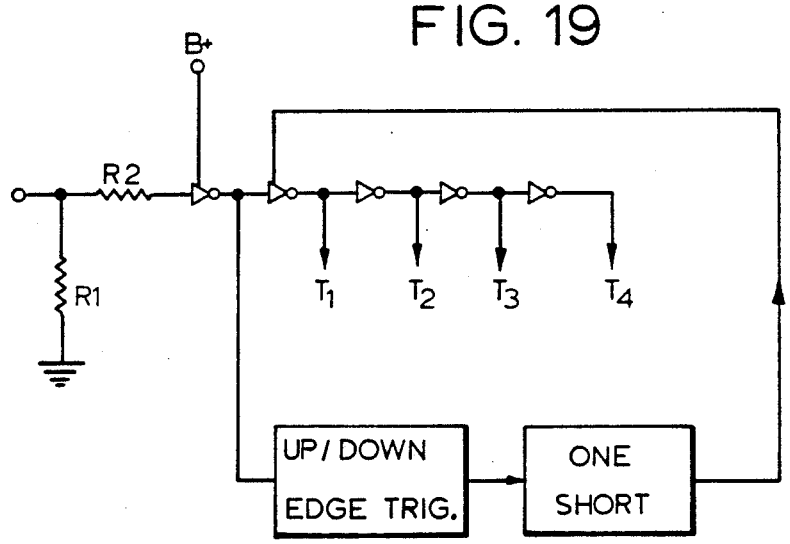
FIG. 19 is a circuit diagram of another modified embodiment of the signal control part for actuating the automatic water supply valve according to the present invention.

FIG. 18 shows a modified embodiment of the signal control circuit for actuating the automatic water supply valve according to the present invention, in which the output of the turn over circuit V1 is grounded through the resistor R3, and the output of the turn over circuit V2 is grounded also through the resistor R4 so that the interior circuit of the 3-state terminal turn over circuits V3–V6 may be controlled. FIG. 19 illustrates another modified embodiment of the signal control circuit for actuating the automatic water supply valve according to the present invention, in which the output of the level converting circuit V0 allows to control the interior circuit of the 3-state terminal turn over circuit V3–V6 through the up/down edge trigger circuit and the one short circuit, so that the actuating signal for the small sized motor can be controlled without microswitches S1 and S2.

As will be understood by those skilled in the art, the element 117a in FIG. 16 is an axle shaft holding plate for shaft 115; element 105a is the terminal piece on the bottom surface of the signal control circuit board, elements 104a are the terminal pieces for the coils of the motor, element 118 is the stator field permanent magnet for the small sized motor, and element 119 is the motor cover cylinder.

In operation, when a persons hands, or another object, are placed or removed from within the range of sensors 5, a control signal is produced which directs valve 100 to be placed in either an ON or OFF position. For example, when a persons hands are placed within or removed from the range of the sensor, a signal is received by the coil 104b of rotor 104a and it is magnetized so that rotor 104a of the small sized motor 104 turns in one direction or the other depending upon whether an on or off signal is received. The reduction gear 116 drives cam 114 in oscillation and, as a result, the protruded portion 114a of the cam pushes one of the steel balls 110a or 110b. Thus either port 111a or 113a within the water pilot cylinders 110, 112 are opened or closed. For example, if piston 110b is driven to close inlet port 111a, then water by-pass hole 109 of the water inlet 102a side is closed and the outlet water by-pass hole 109a of the water outlet 102b side is opened. In that condition water in chamber 107 flows out of the chamber through passages 103b, 113a, and 109a to the outlet 2b, because the main diaphragm 106 is pushed up by the pressure of the supply water, accordingly the water passage is completely opened and the water passes out of valve body 100 to tube 7 for discharge from the top.

Of course the valve operates with the opposite action if port 113a is closed and port 111a is opened upon actuation of rack 114b.

The DC power supply for the device may be 3-8v, being included within the operating range of C-MOS. The control circuit illustrated in FIG. 6 controls the ON-OFF operation of the valve. The cam 114 and the reduction gear 116 of the control circuit part are originally set to the position allowing the microswitch S1 to be OFF, when the input signal "P" from the sensor 5 is low (i.e. "L"). Thus when the control signal is high (i.e. "H") the valve opens and when low "L", it closes. The output of the level converting circuit V0, which is the level converted through the resistor R2, is kept "L" when input is "L" then the output of the turn over circuit V1 will be "H" and the input terminal b of the OR gate V7 (a logical sum circuit) may be represented by "H" through the resistor R3 because the microswitch S1 is in the "OFF" state. The output G of the OR gate V7 then becomes "H" without regard to the input of the microswitch S2. The transistors Q1-Q4 come in to the "OFF" state all together because the inverter of the turn over circuits V3-V6, as a 3-state terminal connection, maintains the high impedance when the output G of the OR gate V7 is inputed with "H". The collector contact points O1 and O2 of each transistors have no outputs, thereby the DC motor remains "OFF".

If the input P becomes "H", the output of the turn over circuit V1 becomes to "L", the output of the turn over circuit V2 becomes "H", but since the microswitch S2 is still in the "ON" state, the output of the turn over circuit V2, passed through the resistor R4, drops and becomes "L". The input terminals a, b of the OR gate V7 become "L" and because the output of the OR gate V7 is "L" the turn over circuits V3-V6 come to the operating state. Since the turn over circuits V3-V6 are serially connected, the output T1 of the turn over circuits V3 becomes "L", the output T2 of turn over circuit V4 becomes "H", the output T3 of the turn over circuit V5 becomes "L", the output T4 of the turn over circuit V6 becomes "H", and the transistors Q1 and Q2, which are connected to the outputs T1 and T2, come to the forward direction bias and become to "ON". The transistors Q3 and Q4 become to the backward direction bias and come to the "OFF" state, thereby the collector contact point O1 of the transistor come to "H", O2 to "L". Thus the power supply is applied to the rotor coil 104b of the small sized DC motor 104 and the rotor 104a begins to rotate in forward direction.

The reduction gear 116 is meshed with the pinion 104c which is fixed on the bottom of the rotor 104a. Another pinion 116a of the reduction gear 116 is meshed with the fragmentary circular arc gear segment 114b and begins to operate. This moves the oscillating rod 114a of cam 114 away so that microswitch S1 comes to the "ON" state (at this moment, even though the microswitch S1 comes to "ON" state, the output of the OR gate V7 is not changed, since the output of the OR gate V7 is not changed until the microswitch S2 comes to "OFF" state, it is preferred that microswitches S1 and S2 may be arranged at the appropriate position for opening and closing the valve), if the microswitch S2 finally comes to the "OFF" state, the output of the turn over circuit V2 comes to "H", then the input terminal a of the OR gate V7 passes through the resistor R4 comes to "H", the output terminal G of the OR gate becomes to "H", the outputs of the turn over circuits V3-V6 comes to high impedance and, therefore, the transistors Q1-Q4 which actuate the small sized DC motor come all together to the "OFF" state, thus the DC motor stops.

If the input P comes to "H", the valve begins to be opened, if the microswitch S2 comes to the "OFF" state, the valve is kept opened and this state is held until the input P is changed to "L".

If the input P comes to "L", the output of the turn over circuit V1 comes to "H" with the reverse order of aforementioned description, since microswitch S1 is in the "ON" state, the input terminal b is "L" and the output of the turn over circuit V2 is "L", the input terminal a of the OR gate V7 comes also to "L", the output G of the OR gate V7 comes to "L", the turn over circuit V3-V6 comes to the operating state, the output T1 of the turn over circuits V3 to "H", the output T2 of the turn over circuit V3 to "H", the output T2 of the turn over circuit V4 to "L", the output T3 of the turn over circuit V3 to "H", the output T4 of the turn over circuit V4 to "L", whereby the transistors Q1 and Q2 come to the "OFF" state. The transistors Q3 and Q4 which are connected to the output T3 and T4 come to forward direction bias, whereby the collector contact point of the transistor O1 comes to "L", O2 to "H" and power supply comes to be applied to the DC motor, thereby the DC motor begins to operate in reverse direction.

This state is the state which the valve turns "OFF", the oscillating rod 114a reaches the microswitch S1 and turns it to the "OFF" state. Since the input terminal b of the OR gate V7 comes to "H", the output G of the OR gate becomes to "H", and the turn over circuits V3-V6 may be changed to the high impedance state. That is to say, the power supply comes to be cut off with the DC motor 4, and this state is continued until the input P is varied.

If the cam 14 is located at an intermediate position between microswitches S1 and S2, and if the state of input P is varied, that is, in case that the input P is varied toward the closing direction while the cam 14 is moving toward the valve opening position, the output G of the OR gate V7 is kept to the "L" state and the state of the transistors Q1-Q4 come to their operating state as long as the period that the cam 14 permits the microswitch S1 and S2 to open and close always in response to the input P. Accordingly, the opening and closing action can be accomplished with least power composition.

The following is a comparison table of the electric power consumption of the automatic water supply valve according to the present invention and the prior art.

| Comparison table of electric power consumption | | |
|---|---|---|
| | Consuming electric power in the moment that the valve begins to be opened | Consuming electric power keeping the state of the valve being opened |
| Prior art automatic water valve | 5-12 w continued. | 5-12 w continued |
| Invention automatic water valve | 0.3 w/01 sec | 0 |

FIGS. 14 and 15 illustrate another embodiment of the present invention, wherein the filter chambers 10a'-1, 10b'-1 are formed in the hot and cold water passing holes 8a-1, 8b-1 of the supply tee or connector pipe 8-1 which is to be connected to the existing hot and cold water supply pipes 28a 28b. The net like filter tubes 10a'-1, 10b'-1 are inserted respectively and locked with the screw sleeve 17-1, while the check valve assembly 18-1, 19-1 are inserted therein so that the hot and cold water passing paths 10a-1, 10b-1 may be opened or closed. In this case the battery container 9 is mounted behind the connector pipe 8-1 assembly, and the connector fittings 8-2 having the hot, and cold water passages 8a-2, 8b-2 extend from the center thereof.

Figure 20:
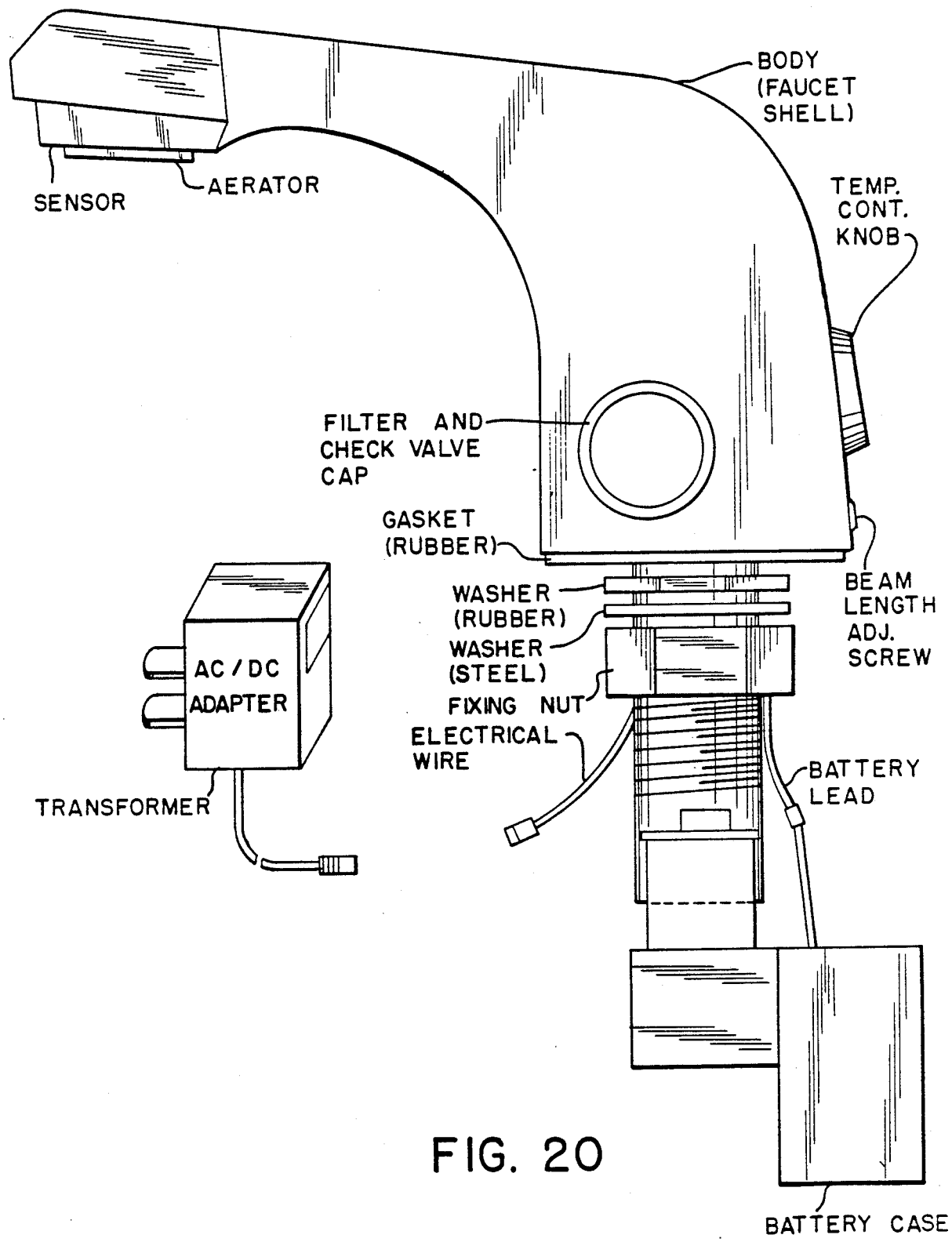
FIG. 20 is a schematic illustration of an AC powered device according to the present invention.

In lieu of a battery type powered supply, an AC/DC adaptor/converter can be used, as seen in FIG. 20.

The water mixing valve means 2 of this embodiment is located within the water tap body 1, that is to say, a cylindrical cavity 51 is formed at the upper end of the water tap fixing pipe 6-1, a water mixing solid cap 52 is fixed within the cavity 51 by the fixing pin 53, and a mixing control block 54 having the hot and cold water outlet holes 54a, 54b and shaped as a cylindrical drum is movably fixed. The outer end of the spiral bimetal 13-1 (see FIG. 15) is fixed by inserting between the two bimetal fixing pins 54' fixed on the mixing control block 54, while the inner end 13a-1 is fixed to the fixing shaft 14-1, the L-shaped valve body 2b-1 having the hot and cold water mixing chamber 12-1 is established around them, and the mixed water outlet 2a-1 is formed above the hot and cold water mixing chamber 12-1 within the valve body 2b-1. The water supply valve 100-1 is arranged behind the L-shaped mixing valve body 2b-1, the water tap body 1 and the water tap fixing pipe 6-1 are fixed with the small bolts 55, and the check valves 18-1, 19-1 with the connector pipe assembly is fixed at the bottom end of the water tap fixing pipe 6-1.

This arrangement is intended to permit the water tap body to be beautifully shaped by maximizing the ability of water tap to be small-sized and to be light-weight. In this case the check valve means and the hot and cold water mixing means which were formed integrally within a mixing valve 2 are divided from each other and the check valve means is removed from the water tap body 1 and fixed below the water tap fixing board.

Figure 5:
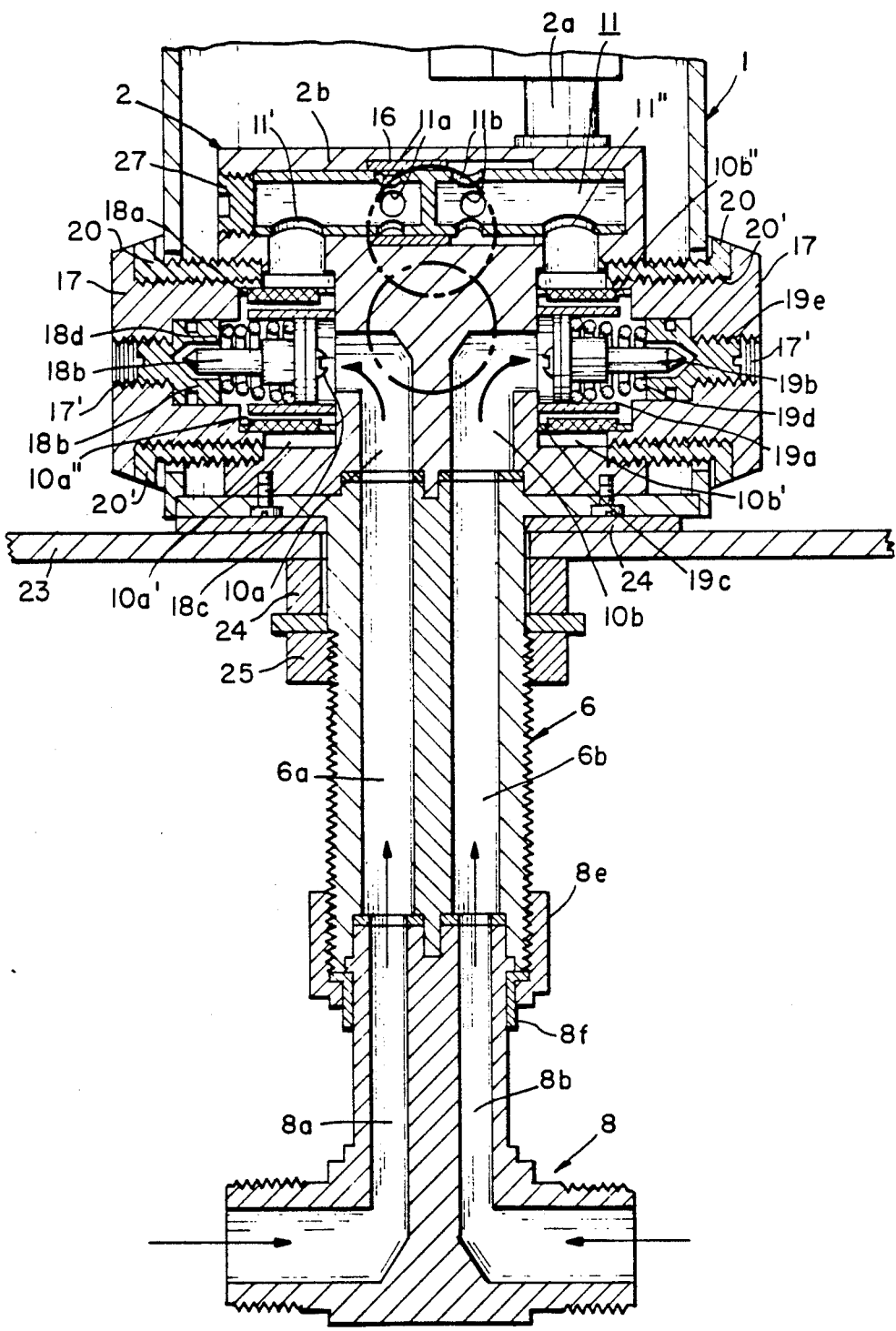
FIG. 5 is a cross sectional view similar to FIG. 4 illustrating the configuration of the elements during operation of the device.
Figure 5A:
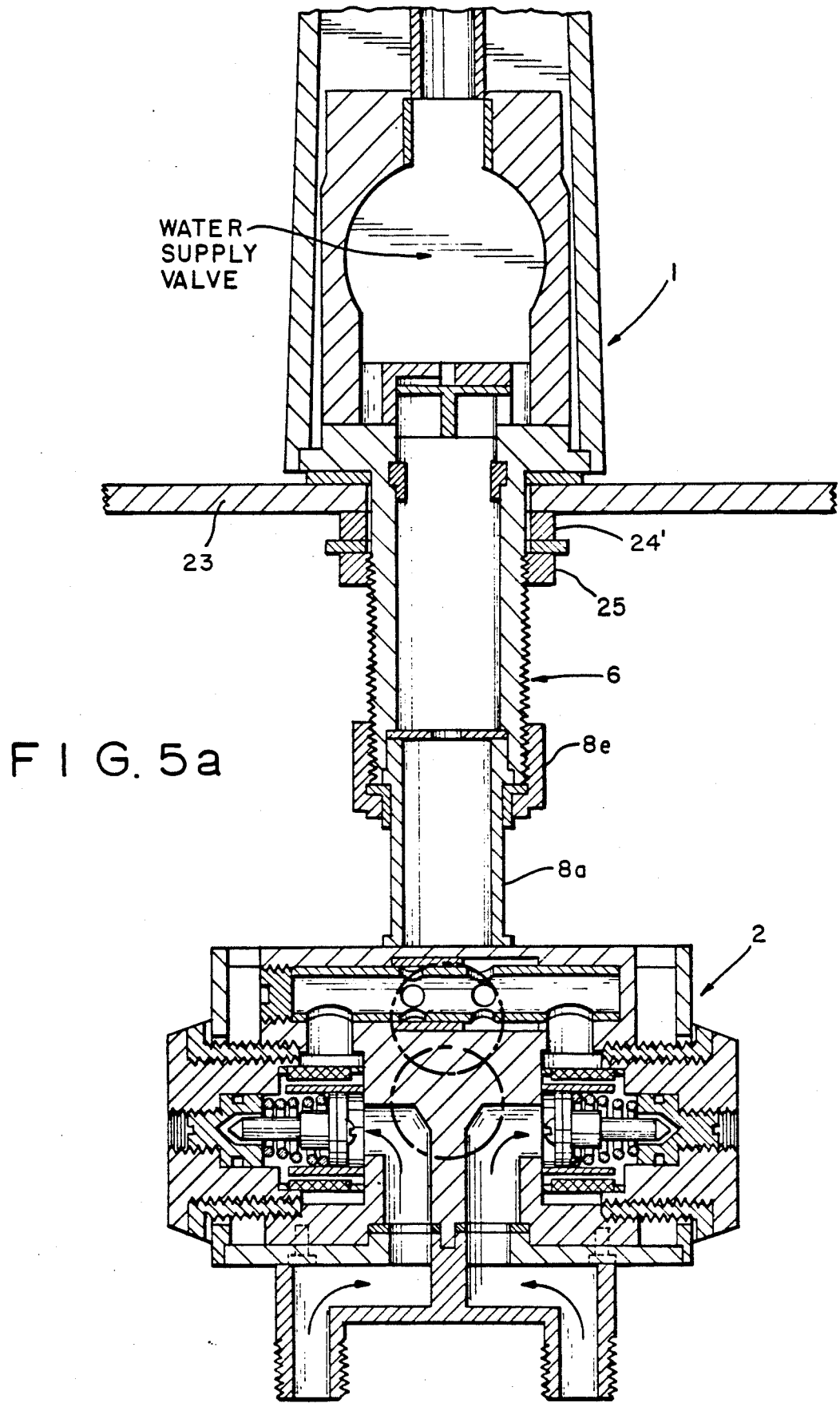
FIG. 5a is a cross-sectional view similar to FIG. 5 of another embodiment of the invention wherein the mixing valve shown in FIG. 5 is located below the surface of the sink outside the shell of the tap.

The operation and the effect of the present invention which is constructed such as described hereinbefore will be explained in detail with reference to the FIG. 5 to 7.

The hot and cold water supplied by the hot and cold water service pipes 28a, 28b are delivered through the hot and cold water passages 8a, 8b of the hot and cold water connector pipe 8 and also through the hot and cold water passages 6a, 6b of the water tap mounting pipe or stem 6. The water then passes through the hot and cold water passages 10a, 10b to the filter chambers 10a', 10b' respectively through the hot and cold water inlets 11', 11" to the hot and cold water mixing tube 11. It then flows through the hot and cold water outlet 11a, 11b, after mixed at the desired temperature by the operation of the bimetal 13 within the hot and cold water mixing chamber 12 and flows out through the outlet pipe 2a. From there the water subsequently flows through the water inlet 100a and reaches the automatic water supply valve 100. When the detecting signal from the detecting sensor 5 is transmitted to the electronic control unit 5', and if the electronic control unit 5' transfers the instruction signal to the operation control circuit (FIG. 13) of the automatic water supply valve 100, the main diaphragm 106 is opened, the mixed water is delivered through the hose 7 connected to the outlet 100b to the water retaining piece 3 and its chamber 3c. It then flows through the plurality of the water flowing holes perforated at the bottom of the water retaining chamber 3c and may be dispersed uniformly and then spouted out of the jet holes 4a of the water jet nozzle 4.

Figure 7A:
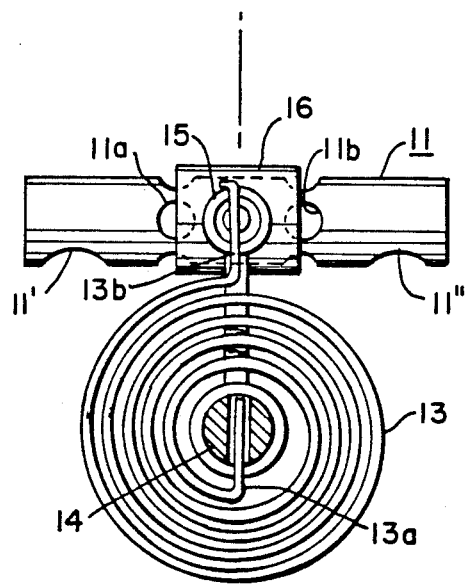

FIG. 7 illustrates the various conditions under which sliding control tube 16, coupled with the opening and closing actuator 15, opens or closes the hot and cold water flowing holes 11a, 11b of the hot and cold water mixing tube 11 in response to the operation of the bimetal 13. When a user wants mixed warm water (appropriate warm water), as shown in FIG. 7A, the sliding control tube 16 coupled with the opening and closing actuator 15 of the bimetal may be located at the intermediate position of the hot and cold water mixing tube 11, accordingly both of hot and cold water flow respectively through cold water outlet hole 11b and hot water outlet hole 11a and all mixed within the hot and cold water mixing chamber 12 of the mixing valve 2. Furthermore the water reaches the automatic water supply valve 100 through the mixed water outlet 2a and if the aforementioned detecting sensor is operated and transmits the signal to the electronic control unit 5', and the electronic control circuit unit 5' transfers the instruction signal to the operation control circuit of the automatic water supply valve to open the main diaphragm 106, the mixed water will be tee discharged out of the water jet nozzle 4 via the hole 7 connected to the outlet 100b.

Figure 7B:
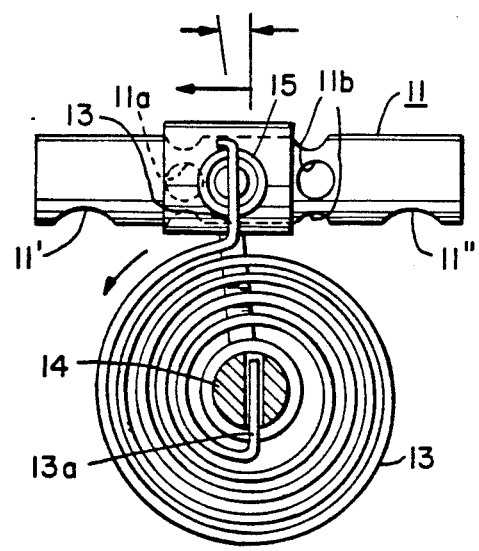

Alternatively, FIG. 7B shows the operating condition of the bimetal 13 for increasing cold water in case the temperature of the mixed warm water is higher than the set temperature. In that condition sliding control tube 16, coupled with the opening and closing actuator 15 of the bimetal 13, closes the hot water outlet hole 11a, and only the cold water flows out of the cold water outlet hole 11b.

Figure 7C:
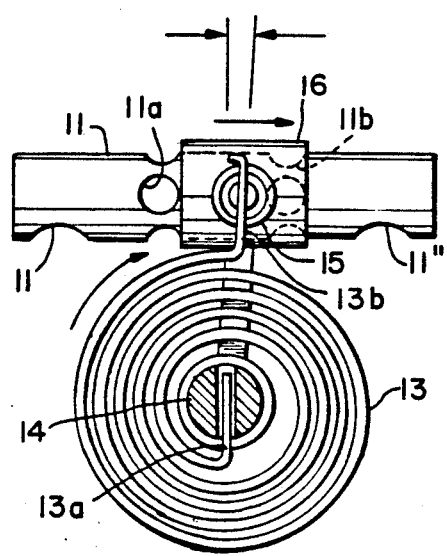

Finally, FIG. 7C shows the operating condition of the bimetal 13 for increasing hot water in case that the temperature of the mixed warm water is lower than the set temperature. In that condition the sliding control tube 16, coupled with the opening and closing actuator 15 of the bimetal 13, closes the cold water outlet hole 11b, and only the hot water flows out, the operational order will be same as aforementioned.

In addition, if the temperature of the hot water supplied by the hot water supply pipe line 28a is higher than the required temperature, the sliding control tube 16 will be moved toward the hot water outlet hole 11a by the operation of the bimetal 13, then the hot water outlet hole 11a may be reasonably closed while the cold water outlet hole 11b may be opened, and the hot and cold water may be mixed within the mixing chamber 12 of the mixing valve 2, accordingly warm water of the desired temperature will be delivered through the mixed water outlet tube 2 to the automatic water supply valve 100. If the temperature of the hot water supply is lower than the required temperature, the sliding control tube 16 will be moved toward the cold water outlet hole 11b by the operation of the bimetal 13, the cold water outlet hole 11b will be reasonably closed while the hot water outlet hole 1a will be opened, so that a user not only can use the water of desired temperature at any time, but also the extravagance of the water more than the required may be avoided.

Thus, the present invention not only maximizes the facilities of utilizing the water tap without touching the handle by automatizing almost completely the all of the operations by applying the latest technical functions to each component for controlling the water supply, but also maximizes the water tap to be small-sized and light-weight. An article of beautiful outward appearance is thus provided by integrating every component within water tap body 1. Further the operational electric power consumption of the automatic water supply valve 100 is minimized so that it may be used for one to ten years with only a lithium cell (3V, 10A/h). Moreover, only the water tap needs to be changed with the existing water pipe line facilities without establishing a new electric power line. Thus construction costs will be greatly decreased. Manufacturing cost are also decreased by miniaturizing the structure.

What is claimed is:

1. A compact automatic water tap including a hollow tap body defining the outer shell of the tap adapted to be located above the surface on which the tap is to be mounted, said tap body having a base adapted to be placed on the surface on which the tap is to be mounted and a water discharge end portion, said tap containing within said shell, between said base and said discharge end portion a hot and cold water mixing valve, sensing means for sensing the presence or absence of an object beneath said water discharge end portion; and an automatic water supply valve means in said shell connected to said mixing valve and being operative in response to said sensing means to control water flow from the tap, and check valve means also located within said shell and connected to the water supply valve for preventing water flow from the water supply when the water supply valve is off.

2. A compact automatic water tap as defined in claim 1, said sensing means includes an infrared signal generator and an infrared signal receiver, said infrared signal generator being mounted in said tap for directing an infarared signal from the tap at an angle of between 0° and 60° from the vertical.

3. A compact automatic water tap as defined in claim 2 wherein said infrared signal generator is located adjacent said water discharge end portion of the tap body.

* * * * *